Patented Mar. 27, 1945

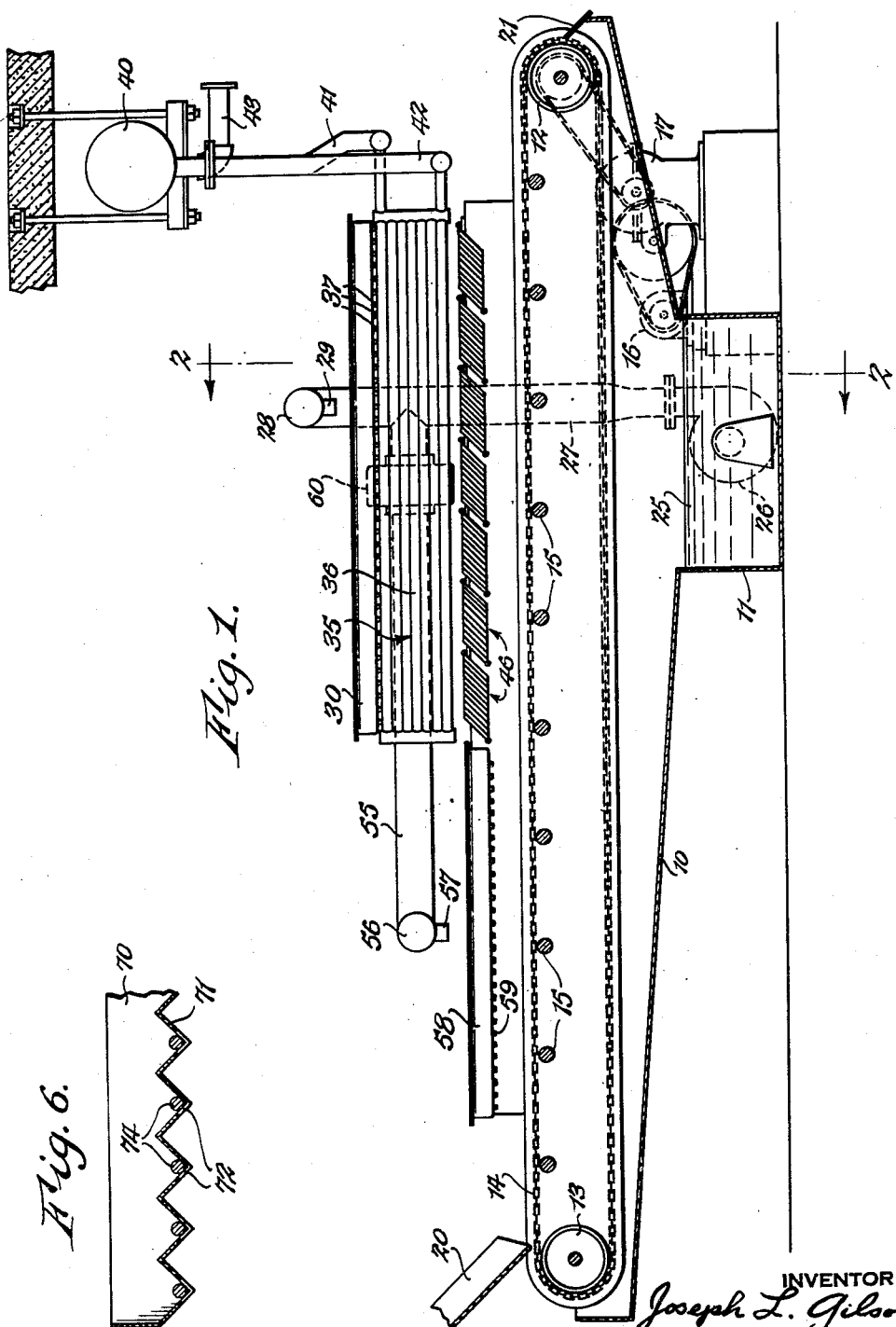

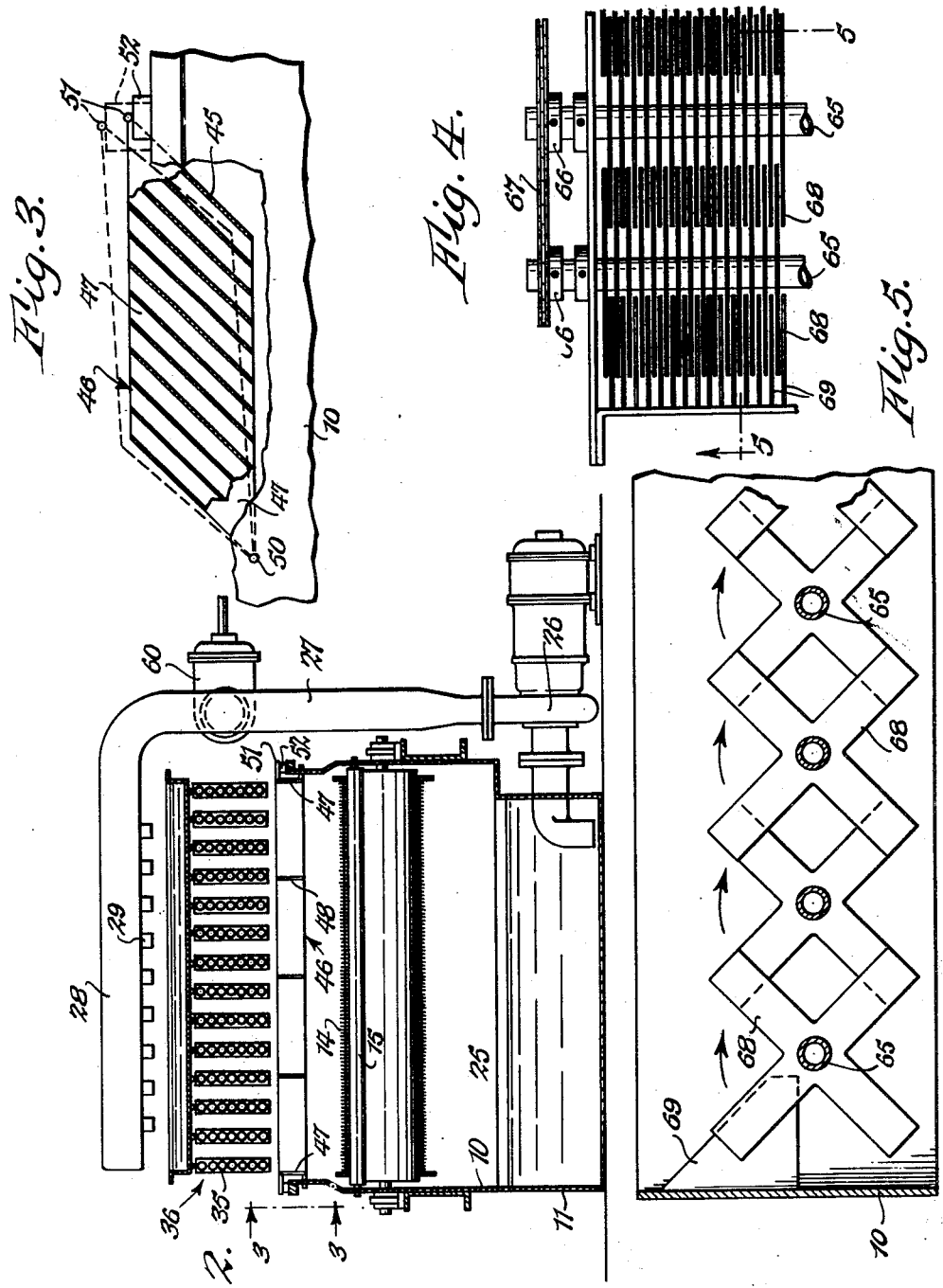

2,372,373

UNITED STATES PATENT OFFICE 2,372,373

METHOD AND APPARATUS FOR FREEZING FOODS

Joseph L. Gilson, Hartsdale, N. Y.

Application September 20, 1940, Serial No. 357,603

14 Claims. (Cl. 62—170)

This invention relates to a method and apparatus for freezing foods and more particularly to such method and apparatus by which the foods are rapidly frozen by direct contact with a liquid refrigerant maintained at a temperature substantially below the freezing point of the food.

The invention is essentially directed to the preservation of fresh fruits and vegetables by rapid freezing through direct contact with a liquid refrigerant to retain to a high degree the fresh taste, color, aroma, texture and other qualities of the preserved product when subsequently thawed. The invention is also particularly directed to such a process in which a syrup is used as the liquid refrigerant and which at the low temperatures necessary to effect rapid freezing of the foods becomes highly viscous. It has heretofore been proposed to rapidly freeze foods through direct contact with a liquid refrigerant by methods which involve either spraying a very cold brine or sugar solution over the product or by immersing the product in an agitated low temperature syrup solution following which the product is lifted out of the solution, centrifuged, and packed. Both of these processes have a number of disadvantages.

While the spray process can be carried out with the product conveyed on a belt conveyer or the like, the necessity of forcing the liquid through fine nozzles to produce the fine spray or fog involves a high power loss where the liquid is viscous, a condition which is necessary where a low temperature syrup solution is employed. Further, where the liquid is recirculated, special care must be taken to prevent seeds or other particles picked up from the product from being carried to the nozzles. Even with careful filtering some particles frequently are carried to the nozzles and cause the nozzles to discharge a high velocity jet of liquid against the passing product instead of a spray thereby to cut a swath of spoiled product in the mass of fruits or vegetables being conveyed.

With the immersion process, the necessity for introducing, conveying and removing the foods being processed through immersion necessarily prevents the use of compact high capacity apparatus. Further the mechanism for carrying out the process is necessarily costly and bulky and the necessity for centrifuging the product following freezing necessarily results in a degree of spoilage of the product.

It is the principal object of the present invention to provide a high capacity method and apparatus for rapidly freezing foods by direct contact with a liquid refrigerant which overcomes the objections to the spray and immersion processes above referred to and produces a uniform product having superior quality.

Another object of the invention is to effect the rapid freezing of the foods by cascading a large number of streams of the liquid refrigerant over a passing mass of the product being processed so that the foods are rapidly frozen by liquid moving at high velocity over the surfaces of the foods; the freezing of the product is uniform even when the foods are conveyed in a mass of substantial depth; and so that no difficulty is encountered when freezing by a viscous syrup.

Another object is to provide such a process in which the liquid brought into contact with the foods is recirculated and in which all small orifices are avoided and the liquid pumped to an elevation from which it flows by gravity over the cooling coils and the product being processed. By this means, the power required to recirculate the freezing liquid is reduced to a minimum and no difficulty is encountered from particles of the product or other debris entrained in the liquid.

Another object is to provide such a process in which there is no danger of crushing or injuring the foods being processed even when these foods are extremely delicate.

Another aim is to provide such a method and apparatus in which the food being frozen is conveyed in a straight line on a horizontal conveyer thereby simplifying the feeding and discharge of the food being processed and simplifying the construction of the apparatus.

Another object is to provide such a method and apparatus in which the food being processed is subjected to preliminary freezing with the freezing liquid at a somewhat higher temperature than the liquid used to effect final freezing, this preliminary freezing at a higher temperature increasing the absorption of sugar and other preservatives from the freezing liquid.

Another purpose is to provide a form of conveyer in which the food being processed is positively tumbled about as it is conveyed past the cascade of streams of freezing liquid thereby to present all faces of the food directly to the streams.

In the accompanying drawings:

Fig. 1 is a vertical longitudinal section, partly in elevation of rapid freezing apparatus embodying my invention.

Fig. 2 is a vertical transverse section taken on line 2—2, Fig. 1.

Fig. 3 is a fragmentary enlarged view similar to Fig. 1 and showing in greater detail the construction of the baffles which effect a cascade of a large number of streams of the freezing liquid over the food being frozen.

Fig. 4 is a fragmentary top plan view of a modified form of conveyer for conveying the food to be frozen through the apparatus.

Fig. 5 is a fragmentary vertical section taken on line 5—5, Fig. 4.

Fig. 6 is a vertical longitudinal section through a modified form of means for distributing the freezing liquid to provide a cascade of many streams over the food being frozen.

The apparatus illustrated is particularly designed to rapidly freeze fruits, such as apple slices, so that the fruit is frozen with the formation of only small crystals and with minimum rupture of the cells and with minimum alteration of its physical structure, except for freezing, thereby to provide, when the fruit is thawed, the maximum retention of the fresh taste, aroma, color, texture and other qualities of the fruit.

The apparatus includes a tank 10 which collects the liquid refrigerant after it has been brought into contact with the fruit and which is provided with a sump 11 from which the liquid refrigerant is withdrawn to be subsequently passed over the coils of a refrigerating apparatus and then through the moving mass of fruit being processed. The tank 10 is shown as supporting a horizontal driving roller 12 at one end and a horizontal driven roller 13 at its opposite end, these rollers being journaled on the side walls of the tank 10 in any suitable manner and supporting an endless wire mesh conveyer belt 14 on the upper stretch of which the fruit being processed is conveyed through the apparatus. This upper stretch of the wire mesh conveyer belt 14 is shown as supported at intervals intermediate its ends on small rollers 15 which can also be journaled on the side walls of the tank 10. The driving roller 12 is shown as being driven by an electric motor 16 through suitable reducing gearing indicated generally at 17.

The fruit to be frozen is shown as being fed onto one end of the wire mesh conveyer belt 14 from a chute 20, the fruit being preferably piled up several inches deep on the conveyer belt. The conveyer belt is moved to convey the mass of fruit so deposited on its upper stretch under the freezing means and the frozen fruit at the opposite end of the conveyer is shown as discharged over an inclined plate 21. It will be understood that any suitable means other than those shown can be employed for placing the fruit on the wire mesh conveyer belt and removing the frozen fruit therefrom, the specific means for this purpose forming no part of the present invention.

The liquid refrigerant 25 used in the rapid freezing of fruit is preferably a commercial invert sugar syrup containing levulose and dextrose. This syrup can also contain preservatives such as citric acid or sodium hydrosulfite. The syrup in this process may have a concentration up to 62 to 72% of invert sugar. This syrup is withdrawn from the sump 11 of the tank 10 by a motor driven pump 26 which forces the syrup upwardly through a vertical pipe 27 having an upper, transversely extending, horizontal branch 28. This branch 28 is shown as provided with a series of discharge nipples 29 which discharge the syrup into an overhead pan 30. The syrup can be of high viscosity, that is, as high as can be continuously flowed from a Baudelot cooling coil and as will be self-draining from a layer or mass of foodstuff on a belt or other foraminous conveyer.

The overhead pan 30 is for the purpose of distributing the freezing liquid over the tubes 35 of a Baudelot coil 36. For this purpose the bottom of the overhead pan 30 is provided with a series of lipped orifices or nipples 37 through which the syrup falls by gravity onto the uppermost of the several series of tubes 35, the syrup flowing by gravity down over the several series of tubes to be then divided into a multiplicity of streams and cascaded over the fruit on the upper stretch of the wire mesh conveyer belt 14 as hereinafter described. The tubes 35 of the Baudelot coil are shown as supplied with a direct expanded refrigerant, such as ammonia, from an overhead float accumulator 40, this accumulator being connected with the headers of the coil 36 by suitable liquid legs 42 and return pipes 41, the accumulator also having the usual suction outlet 43. The syrup flowing over the tubes 35 is thereby refrigerated, the syrup preferably leaving the coils in the range of 7° F.

This syrup falls from the Baudelot coil onto a series of distributing baffles or plates 45 arranged in sections 46, these baffles being arranged and designed to provide a plurality of sheets or streams of syrup which fall by gravity upon the mass of passing fruit on the wire mesh conveyer belt 14 and cascade over and pass through this mass of fruit at high velocity so as to rapidly freeze the fruit by direct contact with the refrigerated syrup. For this purpose each of the sections 46 of these distributing plates or baffles 45 is preferably constructed as follows:

The distributing plates or baffles 45 are in the form of closely spaced plates extending the full width of the wire mesh conveyer belt 14 and arranged below the coil 35 and at an angle of about 45°. The distributing plates or baffles of each section are supported at their ends by end plates 47 of parallelogram shape, the lower edges of which are arranged in a generally horizontal plane and the distributing plates 45 being arranged parallel with the other edges of these end plates. The distributing plates 45 can also be supported by intermediate plates 48 of parallelogram shape as illustrated in Fig. 2. The distributing plates 45 joined to each pair of end plates 47 comprise a section 46, the sections 46 being arranged in a horizontal series under the coil 36 and above the upper stretch of the wire mesh conveyer belt 14. All of the refrigerated syrup falling from the coil 36 falls upon the distributing plates 45 of the several sections 46 of these plates. The liquid falling upon each of the distributing plates 45 spreads or fans out upon the distributing plates so that this liquid is discharged upon the passing mass of fruit in the form of a sheet of falling liquid extending transversely of the line of movement of the fruit. Since a large number of sections 46 are employed and since each section includes a large number of distributing plates 45, it will be seen that the fruit to be frozen is passed through a zone of a multiplicity of sheets of falling refrigerated syrup, this syrup cascading at high velocity over and through the mass of moving fruit so as to rapidly chill and freeze the same. This high velocity creates a high rate of heat transfer between the syrup and the foodstuffs and hence rapid freezing of the foodstuffs. Such high rate of heat transfer cannot be obtained by any process of immersion as by dragging the food through a bath of syrup.

With syrups of different viscosities, it is desirable to provide means for adjusting the inclination of the distributing plates 45 so as to obtain the desired velocity in the sheets of syrup discharged from the plates. For this purpose each of the sections 46 of these distributing plates is provided at its opposite sides with stationary bearing pins 50 which project laterally outward from the lower advance corners of the end plates 47 of each section and are suitably journaled in the side walls of the tank 10. Each of these sections 46 is also provided at the rear upper ends of its end plates 47 with similar bearing pins 51 which are, however, arranged to merely rest upon the upper edges of the side walls of the tank 10. When it is desired to increase the inclination of the distributing plates 45 of the sections 46, to decrease the velocity of the sheets of syrup discharged from these plates, the rear end of each of the sections 46 of these plates is lifted to the desired elevation and a block 52 placed under the bearing pins 51 of the section to maintain the corresponding decreased inclination of the distributing plates 45.

With the preservation of fruits, it is desirable that a certain amount of the sugar, as well as of certain preserving agents, such as sodium hydrosulfite, be absorbed by the fruit. In order to provide an increased absorption of the sugar and preserving agent and also to regulate the amount of the absorption of the sugar and preserving agent, the fruit, in accordance with my invention, is subjected to preliminary freezing with the syrup at a higher temperature as follows:

The vertical pipe 27 from the discharge of the pump 26 is provided with a second horizontal branch 55 which extends lengthwise of the apparatus and toward the feeding end thereof. This branch pipe 55 is extended laterally at its forward end, as indicated at 56, and this laterally extended end is provided with a series of downwardly directed nipples 57 discharging the syrup into a tank 58 arranged over the upper stretch of the wire mesh conveyer belt 14 in advance of the coil 36. This tank 58 extends the full width of the belt 14 and is in turn provided with a plurality of downwardly directed nipples 59 which discharge the syrup onto the mass of fruit being conveyed on the upper stretch of the wire mesh conveyer belt 14. The amount of syrup so discharged is preferably under regulation of a valve 60 in the branch 55.

The syrup discharged upon the fruit conveyed upon the wire mesh conveyer belt 14 both by the pan 58 and by the distributing plate 45 flows through the fruit and is collected in the collecting tank 10. As the recirculation over the cooling coil 36 is rapid, this syrup is at a low temperature and consequently preliminary freezing of the fruit takes place from contact with the syrup discharged from the nipples 59 of the tank 58. However, as this syrup has not been brought into immediate contact with the cooling coil before being discharged onto the fruit, it is at somewhat higher temperature than the syrup discharged by the distributing plates 45. This temperature difference is adjustable in accordance with the product to be frozen and may be such as to have the sugar syrup in the primary stage within two or three degrees of the freezing temperature of the fruit. The preliminary treatment of the fruit by this somewhat higher temperature syrup has been found to greatly increase the amount of sugar and preservative, such as sodium hydrosulfite, which the fruit absorbs, such absorption being directly influenced by the temperature of the syrup applied to the fruit. It will therefore be seen that the direct preliminary treatment of the fruit with the syrup from the pump discharge greatly increases the amount of sugar and preserving agent absorbed by the fruit in a simple and effective manner and that the degree of this absorption is readily controlled by the adjustment of the valve 60.

The modified form of conveyer illustrated in Figs. 4 and 5 is designed to be substituted for the wire mesh belt conveyer 14 and to turn the foods being conveyed over and over as the foods are conveyed under the streams of syrup. By so conveying the mass of fruit, the bottom of the mass is constantly being brought to the top to be in direct contact with the streams of refrigerating syrup and at the same time all of the faces of each individual piece of food is brought into direct contact with these streams. This insures more uniform and faster freezing of the product.

This modified form of conveyer comprises a series of horizontal shafts 65 arranged in spaced relation and extending transversely of the tank 10, the opposite ends of these shafts being suitably journaled in the side walls of this tank. All of the shafts 65 are rotated in the same direction and at the same rate of speed as by the provision of sprockets 66 of uniform size at the ends of the shafts and a common drive chain 67 for these sprockets. Fixed to each of these shafts 65 within the tank 10 is a series of closely spaced cruciform plates 68, the arms of which are in alinement. The series of cruciform plates 68 of one shaft are intercalated with the cruciform plates 68 of the adjacent shaft so that their arms just clear adjacent shafts and the plates of the several shafts are arranged so that the corresponding arms of the plates of the several series are at the same angle. At the feed end of the conveyer, a series of V-shaped vertical plates 69 are suitably secured to the end wall of the tank 10 and these plates 69 project toward the first shaft 65 and are arranged intermediate the cruciform plates 68 of this first shaft.

It will be seen that fruit placed upon the feed end of the conveyer illustrated in Figs. 4 and 5 will be tumbled about and the bottom of the mass of fruit constantly brought to the top. Thus the mass of fruit on the first series of cruciform plates 68 is lifted by the rising arms of these plates and then deposited upon the rising arms of the next series of cruciform plates, this lifting and tumbling of the fruit being continued until the fruit is conveyed through the zone of cascading streams of freezing syrup to the discharge end of the tank 10.

Where the syrup is of such viscosity as to draw together rather than to fan out upon the distributing plates 45, the form of distributor illustrated in Fig. 6 can be employed. This form of distributor is substituted for the sections 46 of distributing plates 45, receiving the chilled syrup from the bottom of the Baudelot coil 36 and depositing this syrup in the form of a multiplicity of cascading streams upon the mass of fruit conveyed thereunder. This modified form of distributor comprises a pan 70 extending the full width of the mass of fruit upon the conveyer 14 and extending the full length of the Baudelot coil 36 in the same manner as with the sections 46 of distributing plates 45. The bottom of this tank is corrugated, the corrugations 71 extending transversely the full width of the tank 70 and being V-shape in form. The bottom of each of these corrugations 71 is provided with a series of holes 72. To regulate the effective size of the holes 72, pieces of wire 74 are loosely laid in the bottom of each corrugation. Where a greater restriction of the holes 72 is desired, wires 74 of larger diameter are used, wires of smaller diameter being substituted where a less restricted flow is desired.

Operation

In the rapid freezing of fruits, such as sliced apples, the sump 11 of the tank 10 is filled with a syrup composed of standard commercial invert sugar and a preserving agent such as sodium hydrosulfite. A refrigerating medium, such as ammonia, is supplied from the float accumulator 40 to the tubes 35 of the Baudelot coil 36. The fruit to be processed is fed down the chute 20 onto the upper stretch of the wire mesh conveyer belt 14. The fruit is massed upon this belt to a depth of several inches and is conveyed through the zone of the multiplicity of cascading sheets of freezing syrup to the discharge end of the belt where the frozen fruit is discharged over the plate 21.

The motor driven pump 26 is in operation, this pump withdrawing the syrup from the bottom of the sump 11 and discharging it through the horizontal branches 28 and 55 of its outlet pipe 27. The syrup from the horizontal branch 28 flows through the nipples 29 into the overhead pan 30 from which it is distributed through the nipples 37 onto the tubes 35 of the Baudelot coil. The syrup flowing over the outside of these tubes is chilled to a temperature of approximately 7° F. and falls from the lowermost tubes of this coil onto the distributing plates 45 of the several sections 46 of these distributing plates. These plates are arranged at an angle and the syrup falling from the Baudelot coil fans out on these plates so that the syrup falls from the lower edge of each of these plates as a continuous sheet extending transversely of the mass of fruit being conveyed thereunder. Since the plates 45 are provided in a large number, these sheets of syrup cascade over the mass of fruit passing through and over all surfaces of the fruit at high velocity thereby to rapidly freeze the fruit. The syrup flows through the mass of fruit and returns to the sump 11 for recirculation.

To regulate the velocity of the sheets of syrup discharged from the distributing plates 45, each of the sections 46 of these plates is capable of being tilted. For this purpose blocks 52 of the desired size can be placed under the pins 51 at the rear end of each section so as to arrange the plates 45 at the desired inclination.

In order to subject the fruit to a preliminary freezing operation at a somewhat higher temperature and thereby secure an increased absorption by the fruit of the sugar and preservative, such as sodium hydrosulfite, contained in the syrup, the branch 55 from the motor driven syrup pump 26 discharges into a pan 58 arranged over the mass of fruit being conveyed by the wire mesh conveyer belt 14 in advance of the distributing plates 45. This syrup falls in a multiplicity of streams from the many nipples 59 provided in the bottom of this tank 58. This syrup likewise cascades over the mass of passing fruit so as to treat all surfaces of the fruit at high velocity and secure rapid freezing of the same. Because this syrup has been bypassed around the Baudelot coil 36, however, it is at a somewhat higher temperature than the syrup discharged onto the fruit by the distributing plates 45. This preliminary freezing with syrup at a somewhat higher temperature than the temperature used in the final processing operation has been found to provide a marked increase in the amount of sugar and preservative absorbed by the fruit. The amount of the syrup used in this preliminary freezing operation can readily be regulated through adjustment of the valve 60.

When it is desired to provide a tumbling movement of the fruit being conveyed through the apparatus and to constantly bring the bottom of the mass of fruit to the top so as to secure direct contact of all surfaces of the individual pieces of fruit with the cascading streams of freezing syrup, the conveyer shown in Fig. 5 is employed. In this form of the invention the fruit is lifted by the rising arms of each of the series of cruciform plates 61 mounted on the several revolving shafts 65 and deposited upon the rising arms of the next succeeding series of cruciform plates. By this means the fruit is constantly carried forwardly and through the zone of the cascading streams of freezing syrup by the rising arms of the several intercalated plates 61 and the fruit is tumbled and turned and the bottom of the mass constantly brought to the top so as to secure direct contact of all of the surfaces of each individual piece of fruit with the streams of freezing syrup.

Where the syrup is of such high velocity as to tend to draw together rather than to fan out upon the distributing plates 45 the form of distributor illustrated in Fig. 6 is employed instead of the several sections 46 of distributing plates 45. In this modification of the invention the freezing syrup falling from the Baudelot coil is caught in the pan 70 and falls through the multiplicity of the orifices 72 in the corrugated bottom of this pan onto the passing mass of fruit. This multiplicity of streams from the orifices 72 cascade over the fruit in the same manner as the sheets from the distributing plates 45. The size of the orifices 72 is readily regulated by laying wires 74 of proper size in each of the corrugations in the bottom of the pan 70, these wires adjusting the effective size of the orifices 72 in accordance with the size of the wires.

From the foregoing it will be seen that the present invention provides a very simple method and apparatus for rapidly freezing foodstuffs which requires a minimum amount of power for the circulation of the viscous freezing syrup; which is not affected by the presence of seeds, stems, or other debris in the freezing syrup and in which the necessity for centrifuging or otherwise treating the product following the freezing is unnecessary. It will further be seen that by cascading a plurality of streams over a passing layer of the fruit, the freezing syrup flows at high velocity over all portions of the fruit so as to rapidly freeze the same. It will further be seen that the apparatus is of high capacity and that the amount of sugar or preservative absorbed by the fruit can readily be adjusted by the regulation of the temperature and amount of the freezing syrup used in the preliminary freezing operation.

I claim as my invention:

1. Apparatus for freezing foodstuffs by direct contact with a liquid of low freezing point, comprising a foraminous support for said foodstuffs, a cooling coil arranged above said foraminous support and having a plurality of tubes, means for passing a refrigerating medium through said tubes, an overhead pan arranged above said cooling coil and having a plurality of orifices for uniform distribution of liquid to said cooling coil, a tank arranged below said foraminous support to collect spent liquid of low freezing point from the foodstuffs on said support, a pump for withdrawing the collected sub-freezing liquid from said tank and having its outlet discharging into said overhead pan, and distributing means interposed between said cooling coil and support for directing the liquid of low freezing point falling from the tubes of said coil in a multiplicity of uniform streams to cascade over and around the fodstuffs on said support.

2. Apparatus for rapidly freezing foodstuffs by direct contact with a liquid of low freezing point, comprising a foraminous support for said foodstuffs, a cooler arranged above said foraminous suport, a tank arranged below said foraminous support to collect spent liquid of low freezing point from the foodstuffs on said support, means for withdrawing said collected liquid from said tank and passing it over said cooling means in heat exchanging relation therewith, said cooled liquid falling by gravity from said cooling means, and distributing means for directing said falling liquid of low freezing point in a multiplicity of uniform streams to cascade over and around the foodstuffs on said support, comprising a plurality of spaced distributing plates extending transversely under said cooler to receive said falling liquid of low freezing point, said plates being disposed at an angle to the horizontal to provide a plurality of sheets of liquid of low freezing point falling from the lower edges of said plates onto said foodstuffs.

3. Apparatus for rapidly freezing foodstuffs by direct contact with a liquid of low freezing point, comprising a foraminous support for said foodstuffs, a cooler arranged above said foraminous support, a tank arranged below said foraminous support to collect spent liquid of low freezing point from the foodstuffs on said support, means for withdrawing said collected liquid of low freezing point from said tank and passing it over said cooling means in heat exchanging relation therewith, said cooled liquid of low freezing point falling by gravity from said cooling means, distributing means for directing said falling liquid of low freezing point in a multiplicity of uniform streams to cascade over and around the foodstuffs on said support, comprising a plurality of sections mounted on said tank, each comprising vertical end plates and a plurality of spaced distributing plates arranged under said cooler to receive said falling liquid of low freezing point, said distributing plates being disposed at an angle to the horizontal to provide a plurality of sheets of liquid of low freezing point falling from the lower edges of said plates onto said foodstuffs, and means for adjustably varying the elevation of one side of each of said sections to vary the angle of the distributing plates thereof.

4. Apparatus for rapidly freezing foodstuffs by direct contact with a liquid of low freezing point, comprising a foraminous conveyer for conveying said foodstuffs horizontally, a cooling coil, means for passing a refrigerating medium through said cooling coil, a tank arranged below said conveyer to collect spent liquid of low freezing point from the foodstuffs on said conveyer, means for withdrawing said collected liquid of low freezing point from said tank and passing it over said cooling coil in heat exchanging relation therewith, distributing means for directing said liquid of low freezing point after leaving said coil to provide a multiplicity of uniform streams cascading over and around the foodstuffs on said conveyer to freeze said foodstuffs at a low temperature, and means in advance of said distributing means for distributing a part of said withdrawn liquid of low freezing point over said foodstuffs on said conveyer to prefreeze said foodstuffs at a higher temperature.

5. Apparatus for rapidly freezing foodstuffs by direct contact with a liquid of low freezing point, comprising a foraminous conveyer for conveying said foodstuffs horizontally, a cooling coil, means for passing a refrigerating medium through said cooling coil, a tank arranged below said conveyer to collect spent liquid of low freezing point from the foodstuffs on said conveyer, means for withdrawing said collected liquid of low freezing point from said tank and passing it over said cooling coil in heat exchanging relation therewith, distributing means for directing said liquid of low freezing point after leaving said coil to provide a multiplicity of uniform streams cascading over and around the foodstuffs on said conveyer to freeze said foodstuffs at a low temperature, and means in advance of said distributing means for distributing a part of said withdrawn liquid of low freezing point over said foodstuffs on said conveyer to pre-freeze said foodstuffs at a higher temperature, comprising a pan arranged over said conveyer in advance of said distributing means, means for delivering said part of said withdrawn liquid of low freezing point to said pan and a multiplicity of orifices in the bottom of said pan and discharging said liquid in a multiplicity of streams cascading over said foodstuffs on said conveyer.

6. Apparatus for rapidly freezing foodstuffs by direct contact with a liquid of low freezing point, comprising means for supporting said foodstuffs, means above said supported foodstuffs for directing a multiplicity of streams of said liuqid of low freezing point to fall by gravity onto said supported foodstuffs to cascade thereover, comprising a pan having a corrugated bottom, each of said corrugations being provided in its bottom with a multiplicity of openings, means for delivering said liquid of low freezing point to said pan and means for regulating the effective size of said openings comprising pieces of wire of predetermined size laid in said corrugations and covering a part of the openings therein.

7. Apparatus for rapidly freezing foodstuffs by direct contact with a liquid of low freezing point, comprising a conveyer for conveying said foodstuffs through a freezing zone including a series of parallel shafts arranged in a horizontal plane, means for rotating said shafts in the same direction and at the same speed, a series of spaced cruciform plates fast to each of said shafts, the arms of each series of said plates being intercalated with the arms of each adjacent series whereby the rising arms of one series delivers the foodstuffs being conveyed to the rising arms of the next succeeding series of said plates to progress said foodstuffs horizontally transversely of said shafts and agitate the foodstuffs so conveyed, and means for applying said liquid of low freezing point to the top of said foodstuffs so conveyed through said freezing zone.

8. The method of rapidly freezing foodstuffs by direct contact with a liquid of low freezing point containing an ingredient absorbable from the liquid of low freezing point by said foodstuffs, which comprises conveying said foodstuffs horizontally in a layer through a prefreezing zone and a final freezing zone, directing a multiplicity of closely spaced streams of liquid of low freezing point in said final freezing zone to cascade over and through said foodstuffs, collecting said spent liquid of low freezing point after leaving said layer of foodstuffs, cooling one part of said collected liquid of low freezing point, returning said one part of said cooled liquid of low freezing point to provide said streams, and discharging the other part of said collected liquid of low freezing point in a multiplicity of streams to cascade over and through said foodstuffs while traversing said prefreezing zone.

9. The method of rapidly freezing foodstuffs by direct contact with a liquid of low freezing point which coprises conveying said foodstuffs horizontally in a layer through a freezing zone, continuously working the foodstuffs in said layer from the bottom to the top thereof while traversing said freezing zone to expose all surfaces of the individual pieces of foodstuffs at the top of said layer and applying low temperature liquid of low freezing point to the top of said layer while traversing said freezing zone.

10. Apparatus for rapidly freezing foodstuffs by direct contact with a liquid of low freezing point, comprising a foraminous conveyer for transporting a single layer of said foodstuffs in a generally horizontal direction, means directly above and in closely spaced relation to said layer and propagating, by the force of gravity, a plurality of solid streams of said liquid of low freezing point to fall over substantially the entire width of said layer and over a substantial part of the length thereof and in sufficient volume to cascade over and around said foodstuffs, and means arranged directly under said conveyer for collecting the spent liquid, the propagation of said streams by the force of gravity providing a low impact velocity of said streams against said foodstuffs.

11. Apparatus for rapidly freezing foodstuffs by direct contact with a liquid of low freezing point, comprising a foraminous conveyer for transporting a layer of said foodstuffs in a generally horizontal direction, a multiplicity of deflecting plates arranged directly above and the full width of said layer and extending a substantial part of the length of said layer and arranged to discharge, by the force of gravity, a multiplicity of continuous solid sheets of liquid at low velocity against said layer of foodstuffs to cascade over and around said foodstuffs, means arranged directly below said layer of foodstuffs for collecting the spent liquid after passage through said layer, and a cooling surface, said liquid being conducted to traverse said cooling surface and thence being conducted to said deflecting plates.

12. Apparatus for rapidly freezing foodstuffs by direct contact with a liquid of low freezing point, comprising a foraminous conveyer for transporting a layer of said foodstuffs in a generally horizontal direction, a cooling coil arranged immediately above said conveyer and from which said liquid falls by gravity and at a low velocity toward said layer, a plurality of deflecting members arranged immediately above said layer of foodstuffs and below said cooling coil and extending the full width of said layer and extending a substantial part of the length of said layer, said deflecting members being arranged in the path of the liquid falling from said cooling coil and distributing said liquid in the form of a multiplicity of continuous solid streams of liquid against said layer of foodstuffs to cascade over and around said foodstuffs, means arranged directly below said layer of foodstuffs for collecting the spent liquid after passage through said layer, and means for conducting said spent liquid to discharge against said cooling coil.

13. Apparatus for rapidly freezing foodstuffs by direct contact with a liquid of low freezing point, comprising a foraminous support for a layer of said foodstuffs, an open horizontal pan arranged over said support and having a multiplicity of holes in its bottom through which said liquid falls by gravity toward said layer, a cooling coil interposed between said pan and said layer and receiving and cooling the liquid falling from said openings, a plurality of deflecting members arranged immediately above said layer and below said cooling coil and in the path of the liquid falling from said cooling coil, said deflecting members distributing said liquid in the form of a multiplicity of continuous solid streams of liquid against said layer of foodstuffs to cascade over and around said foodstuffs, means arranged directly below said layer of foodstuffs for collecting the spent liquid after passage through said layer, and means for conducting said spent liquid to said pan.

14. The method of rapidly freezing foodstuffs by direct contact with a liquid of low freezing point, which comprises moving said foodstuffs in a single layer of substantially uniform width through a freezing chamber, and directing a multiplicity of closely spaced, continuous, solid streams of said liquid to fall by gravity and from a short distance above said layer and over substantially the full width and a substantial part of the length thereof, said solid streams being in sufficient volume and striking said foodstuffs with a low force of impact to cascade over and through said foodstuffs.

JOSEPH L. GILSON.